US010863037B2

(12) United States Patent
Nakano et al.

(10) Patent No.: US 10,863,037 B2
(45) Date of Patent: *Dec. 8, 2020

(54) CHARGING APPARATUS, METHOD, SYSTEM, AND NON-TRANSITORY MEDIUM

(71) Applicant: NEC CORPORATION, Tokyo (JP)

(72) Inventors: Shintaro Nakano, Tokyo (JP); Satoru Ishii, Tokyo (JP); Hideo Hasegawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/733,369

(22) Filed: Jan. 3, 2020

(65) Prior Publication Data

US 2020/0153975 A1 May 14, 2020

Related U.S. Application Data

(63) Continuation of application No. 15/559,116, filed as application No. PCT/JP2016/058456 on Mar. 17, 2016, now Pat. No. 10,560,582.

(30) Foreign Application Priority Data

Mar. 19, 2015 (JP) ................................. 2015-056370

(51) Int. Cl.
*H04M 15/00* (2006.01)
*H04W 4/24* (2018.01)

(52) U.S. Cl.
CPC ........... *H04M 15/61* (2013.01); *H04M 15/00* (2013.01); *H04M 15/66* (2013.01); *H04M 15/72* (2013.01);

(Continued)

(58) Field of Classification Search
CPC ....... H04W 4/24; H04M 15/00; H04M 15/61; H04M 15/66; H04M 15/72; H04M 15/77;

(Continued)

(56) References Cited

U.S. PATENT DOCUMENTS 8,107,921 B2   1/2012  Fiatal
8,909,192 B2   12/2014 Fiatal
(Continued)

FOREIGN PATENT DOCUMENTS

JP   2002279509 A    9/2002
JP   2002-288461 A  10/2002
(Continued)

OTHER PUBLICATIONS

Notification of Reasons for Refusal dated Oct. 30, 2018 from the Japanese Patent Office in counterpart application No. 2017-506603.

(Continued)

*Primary Examiner* — Wayne H Cai
(74) *Attorney, Agent, or Firm* — Sughrue Mion, PLLC

(57) ABSTRACT

User identification information for identifying a user of a first terminal connecting to a communication network of a virtual communication operator via a communication network of a first communication operator is specified, and, based on the user identification information, charging for communication of the first terminal and charging for a service that the virtual communication operator is enabled to provide to the user identified by the user identification information are managed.

12 Claims, 7 Drawing Sheets

(52) U.S. Cl.
CPC ......... *H04M 15/77* (2013.01); *H04M 15/771* (2013.01); *H04M 15/772* (2013.01); *H04M 15/852* (2013.01); *H04W 4/24* (2013.01)

(58) Field of Classification Search
CPC . H04M 15/771; H04M 15/772; H04M 15/852
See application file for complete search history.

(56) References Cited

U.S. PATENT DOCUMENTS

| | | |
|---|---|---|
| 8,914,002 B2 | 12/2014 | Fiatal |
| 9,386,433 B2 | 7/2016 | Fiatal |
| 9,473,914 B2 | 10/2016 | Fiatal |
| 9,712,986 B2 | 7/2017 | Fiatal |
| 9,894,555 B2 | 2/2018 | Tsuda |
| 2008/0130524 A1 | 6/2008 | Volach et al. |
| 2009/0181641 A1 | 7/2009 | Fiatal |
| 2011/0294463 A1 | 12/2011 | Fiatal |
| 2011/0294464 A1 | 12/2011 | Fiatal |
| 2012/0028601 A1 | 2/2012 | Bellofatto et al. |
| 2012/0178414 A1 | 7/2012 | Fiatal |
| 2013/0315061 A1 | 11/2013 | Tsuda |
| 2014/0194093 A1 | 7/2014 | Tsuda |
| 2014/0273944 A1 | 9/2014 | Ramprasad |
| 2014/0289803 A1 | 9/2014 | Sharma et al. |
| 2015/0111541 A1 | 4/2015 | Fiatal |
| 2015/0148020 A1 | 5/2015 | Laden et al. |
| 2015/0163694 A1 | 6/2015 | Raleigh |
| 2016/0029191 A1 | 1/2016 | Fiatal |
| 2016/0249223 A1 | 8/2016 | Egner et al. |
| 2017/0013136 A1 | 1/2017 | Fiatal |

FOREIGN PATENT DOCUMENTS

| | | |
|---|---|---|
| JP | 2005-070884 A | 3/2005 |
| JP | 2012-165154 A | 8/2012 |
| JP | 2013-046336 A | 3/2013 |
| WO | 2003/049404 A1 | 6/2003 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 9)" 3GPP TS 23.401 v9.5.0, Jun. 2010; 259 pages.

"3rd Generation Partnership Project; Technical Specification Group Services and System Aspects; Telecommunication management; Charging management; Online Charging System (OCS): Applications and interfaces (Release 12)", 3GPP TS 32.296 v12.3.0, Dec. 2014, 95 pages.

"3rd Generation Partnership Project; Technical Specification Group Services and System Aspects; Policy and charging control architecture (Release 13)", 3GPP TS 23.203 v13.2.0, Dec. 2014, 230 pages.

"Network Functions Virtualisation (NFV); Management and Orchestration", ETSI GS NFV-MAN 001 v1.1.1 Dec. 2014, 184 pages.

International Search Report for PCT/JP2016/058456 dated Jun. 7, 2016 [PCT/ISA/210].

Written Opinion for PCT/JP2016/058456 dated Jun. 7, 2016 [PCT/ISA/237].

Communication dated Sep. 29, 2020 from Japanese Patent Office in JP Application No. 2019-124959.

CHARGING APPARATUS, METHOD, SYSTEM, AND NON-TRANSITORY MEDIUM

DESCRIPTION OF RELATED APPLICATIONS

This application is a Continuation of U.S. application Ser. No. 15/559,116 filed Sep. 18, 2017, which is a National Stage of International Application No. PCT/JP2016/058456 filed Mar. 17, 2016, claiming priority based on Japanese Patent Application No. 2015-056370 filed Mar. 19, 2015, the contents of all of which are incorporated herein by reference in their entirety.

TECHNICAL FIELD

The present invention relates to a charging apparatus, a method, system, and a non-transitory medium.

BACKGROUND

First, an Evolved Packet Core (EPC) network accommodating an LTE (Long Term Evolution) radio access network will be described. FIG. 1 schematically illustrates how terminals 1A and 1B contracting with telecommunications carriers A and B respectively connect to the Internet, respectively. A communication operator that possesses a communication infrastructure such as a base station, a core network, or the like, is called a carrier or MNO (Mobile Network Operator) carrier. Meanwhile, a communication operator that borrows a necessary communication facility(s) such as a wireless infrastructure including a base station or the like from a MNO carrier, for example, and provides a mobile communication service under its own brand is called a MVNO (Mobile Virtual Network Operator) carrier (virtual communication operator).

EPC 20A, which is a core network of a carrier A, includes, for example, SGW (Serving Gateway) 21A, PGW (Packet Data Network) Gateway 22A, MME (Mobility Management Entity) 23A, HSS (Home Subscriber Server) 25A, PCRF (Policy Charging Rules Function) 24A, PCEF (Policy and Charging Enforcement Function) 26A, and the like. Representative elements of the EPC will be briefly described here (for details, reference will be made to the 3GPP (3rd Generation Partnership Project) specification (3GPP TS 23.401 V9.5.0 (2010-06)), etc., for example). MME 23A performs various processes such as mobility management and authentication of a user equipment (UE) 1A, setting of a user data transfer path, and the like. MME 23A cooperates with HSS 25A to perform user mobility management, authentication, and the like. HSS 25A holds user profile information (including contract information, authentication information, etc.). SGW 21A performs transmission and reception of user data to and from a base station (evolved NodeB: eNB) 10A and performs setting and release of a communication path between SGW 21A and PGW 22A. PGW 22A connects to a packet data network (PDN) such as IMS (IP Multimedia Subsystem) and the Internet 30, and performs allocation of an IP (Internet Protocol) address (private IP address) to the terminal 1A. PCRF 24A is a policy control apparatus that determines policy control such as QoS (Quality of Service) and a charging control rule. PGW 22A and SGW 21A perform policy control on a per packet basis, for example, based on notification information (policy) from PCRF 24A. PCRF 24A determines a policy regarding access control of a user IP flow and QoS parameter value, and PCEF (Policy and Charging Enforcement Function) 26A performs according to the policy, the access control for a user IP flow and the corresponding QoS control. In FIG. 1, the alphanumeric characters S1, S5, S8, SGi, etc., attached to signal lines represent interfaces. "U" of S1-U represents a user plane (User Plane). S1-U represents a S1 user plane interface (where a user IP packet is transferred) between a base station (eNB) and an SGW.

Regarding charging, there are provided an online charging system (Online Charging System: OCS) that captures a communication amount of a terminal in real time to compare the amount with a prepaid fee, and an offline charging system (Offline Charging System: OFCS) that accumulates a communication amount, on a monthly basis, or the like, after a subscriber uses the network resources. An online charging system (OCS) (not illustrated) manages a communication amount to carry out conversion of the communication amount with a prepaid balance. PCRF 24A cooperates with OCS (not illustrated) to manage a communication policy. PCEF 26A applies the communication policy to a packet transfer in PGW 22A.

It is noted that PCEF 26A may be implemented in PGW 22A. For example, a high-speed communication policy is applied to a terminal with a prepaid type charging contract, GCS instructs application of a quota of 1 GB (Giga Bytes), for example, to PCEF 26A, which applies a high-speed communication. If there is a prepaid balance (corresponding communication amount), high-speed communication is allowed, and when the prepaid balance is 0, that is, when 1 GB is used up, PCRF 24 switches to a low-speed communication policy and applies low-speed communication. It is noted that the quota may be a calling time or the like.

PCRF 24A includes PCRF database 24A-1 including a statistical information table 24A-2 for holding statistical information such as packet count, packet fee, call time, call charge, etc., and contract information such as packet plan, and a contract information table 24A-3 for holding contract information such as a packet plan and a call plan. EPC 20B, which is the core network of the carrier B, has the same configuration as that of EPC 20A, which is the core network of the carrier A, described above, so the description of EPC 20B will be omitted.

The terminal 1A contracting with the carrier A and the terminal 1B contracting with the carrier B are individually charged from the carrier A and the carrier B, respectively.

For details of OCS, reference may be made to 3GPP Specification (3GPP TS 32.296 V12.3.0 (2014-12)) and the like. For details of PCRF, PCEF, etc., reference may be made to the specifications of 3GPP (3GPP TS 23.203 V13.2.0 (2014-12)) and the like.

Non-Patent Literature 1: ETSI OS NFV-MAN 001 V1.1.1 (2014-12) Network Functions Virtualization (NFV); Management and Orchestration, retrieved on Jan. 25, 2015. The Internet <http://www,etsi.org/deliver/etsi_gs/NFV-MAN/001_099/001/01.01.01_60/gs_NFV-MAN001v010101p.pdf>

SUMMARY

An analysis of the related art will be given in the below.

As described with reference to FIG. 1, charging for terminals using a plurality of carriers is managed for each carrier. The same applies to a user's terminal contracting with an MVNO carrier that provides a communication service by borrowing communication facilities owned by a plurality of carriers, respectively. When a user has a terminal (for example, a terminal of MVNO carrier) that uses communication facilities of different carriers (for example, different MNO carriers), charging is performed for each carrier individually. As a result, it becomes complicated for a user side to manage bills, etc., from respective carriers. That is, unification of charging management is desired for a user having one or more terminals that use communication facilities of a plurality of carriers, for example.

A main object of the present invention is to provide an apparatus, a system, a method, and a non-transitory medium storing a program, each enabling unification of charging management for a user owning one or a plurality of terminals using communication facilities of a plurality of carriers.

Further, in relation to the above problem, there are proposed an apparatus, a system, and a method, each realizing a unified charging for a user who uses a site(s) providing various services and for the user contracting with a MVNO carrier.

According to one aspect of the present invention, there is provided an charging management apparatus connected to a communication network of a virtual communication carrier, the apparatus comprising a first unit that specifies user identification information for identifying a user of a first terminal connecting to the communication network of the virtual communication operator via a first communication network of a first communication operator; and a second unit that manages charging for communication of the first terminal and charging for a service that the virtual communication operator is enabled to provide to the user identified by the user identification information.

According to another aspect of the present invention, there is provided a charging management apparatus that connects to a third communication network of a virtual communication operator that provides a communication service using a communication facility of a first communication network of a first communication operator and a communication facility of a second communication network of a second communication operator, the apparatus comprising:

a first unit that specifies first user identification information for identifying a user of a first terminal connected to the third communication network of the virtual communication operator via the first communication network, and specifying second user identification information for identifying a user of a second terminal connected to the third communication network of the virtual communication operator via the second communication network; and a second unit that manages charging for communication of the first terminal, based on the first user identification information, the second unit that manages charging for communication of the second terminal based on the second user identification information.

According to another aspect of the present invention, there is provided a communication system comprising:

a communication network of a virtual communication operator that provides a communication service by using a communication facility of a first communication network of a first communication operator and a communication facility of a second communication network of a second communication operator; and a charging management apparatus connected to the communication network of the virtual communication operator, wherein the charging management apparatus comprises:

a first unit that specifies user identification information for identifying a user of a first terminal connecting to the communication network of the virtual communication operator via the first communication network; and a second unit that manages charging for communication of the first terminal and charging for a service that the virtual communication operator is enabled to provide to the user identified by the user identification information.

According to still another aspect of the present invention, there is provided a charging management method comprising:

specifying user identification information for identifying a user of a first terminal connecting to a communication network of a virtual communication operator via a first communication network of a first communication operator; and managing charging for communication of the first terminal and charging for a service that the virtual communication operator is enabled to provide to the user identified by the user identification information.

According to still another aspect of the present invention, there is provided non-transitory computer readable recording medium storing therein a program causing a computer constituting an charging management apparatus connected to a communication network of a virtual communication operator to execute:

a first processing that specifies user identification information for identifying a user of a first terminal connecting to the communication network of the virtual communication operator via a first communication network of a first communication operator, and a second processing that manages charging for communication of the first terminal and charging for a service that the virtual communication operator is enabled to provide to the user identified by the user identification information.

According to the present invention, it is possible to realize a unified management of charging for communication and charging for a service that can be provided to a user based on user identification information. According to the present invention, it is also possible to realize unification of charging management for a user owning one or a plurality of terminals using communication facilities of a plurality of carriers. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

In the following, a related invention as a premise of the invention will be described, and then embodiments of the present invention will be described.

Figure 2:
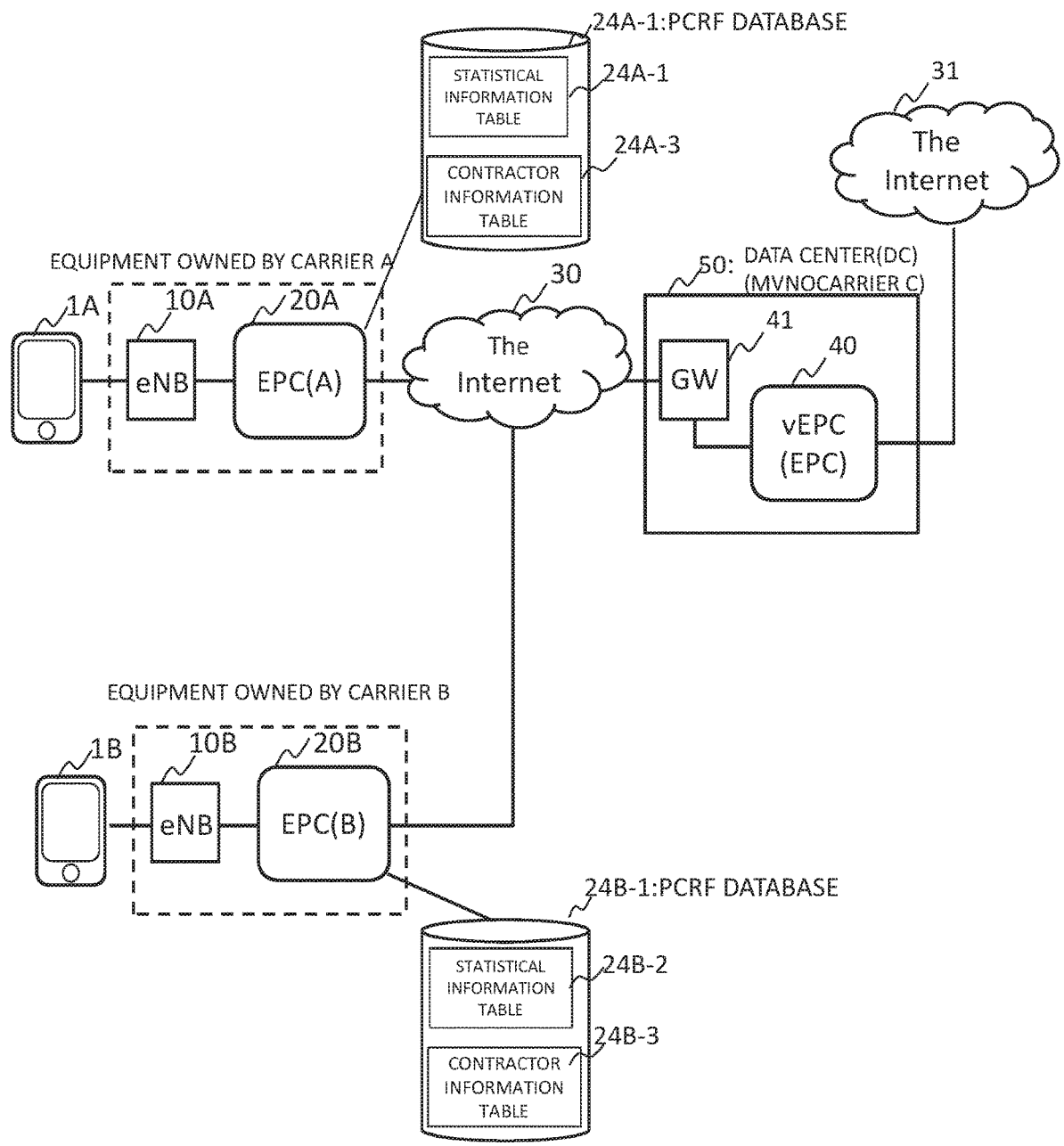
FIG. 2 is a diagram illustrating a related invention.

In SDN (Software Denned Network)/NFV (Network Function Virtualization) a plurality of network appliances that individually require a casing are integrated on a server using a virtualization technology. For example, virtualization of EPC (Evolved Packet Core) or the like, which is a core network of a communication operator, is in progress. In a virtualized EPC (Virtualized EPC: vEPC), for example, at least one or all of the functions of nodes such as SGW, PGW, MME, HSS, PCF and the like, are implemented in a software-based manner by an application running on a virtual machine (VM). A software that implements a virtualized network function is called VNF (Virtual Network Function) (one VNF is realized using one or more VMs). An execution infrastructure of a VNF, such as a hypervisor, which is a virtualization mechanism for virtualizing hardware resources (computing, storage, network interface controller NIC), etc.), and hardware resources to be virtualized, is called a NEVI (Network. Function Virtualization infrastructure) (reference may be made to Non-Patent Document 1 for details), FIG. 2 is a diagram illustrating the related invention as a premise of the present invention. In the following, it is assumed that a data center operator having a data center (DC) within a business establishment is a cloud operator that provides various services (for example, cloud services such as file storage, data sharing, electronic-mail, use of a server, etc.) to clients. A virtual EPC network (vEPC) 40 is constructed on a server (not illustrated) in the data center (DC) 50, whereby, as an MVNO (Mobile Virtual Network Operator) carrier C, a communication service is provided to a client (contracting with the MVNO carrier C).

Figure 1:
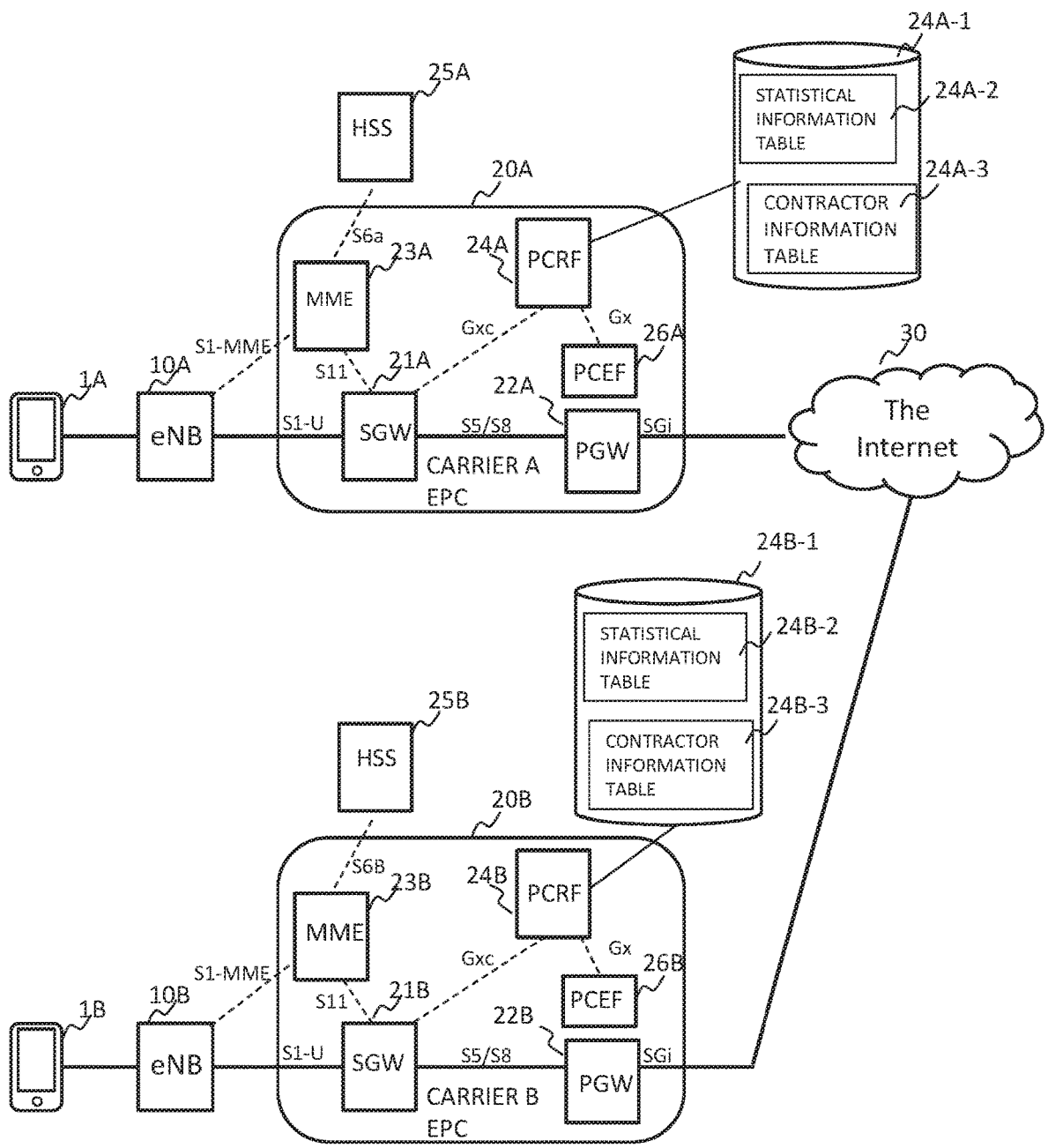
FIG. 1 is a diagram illustrating a related art.

In FIG. 2, a communication facility such as a base station 10A, EPC (A) 20A, or the like is a facility owned by an MNO carrier A, and a communication facility such as a base station 10B, EPC (B) 20B, or the like is a facility owned by an MNO carrier B. In FIG. 2, EPC (A) 20A and EPC (B) 20B are the same as EPC (A) 20A and EPC (B) 20B in FIG. 1 and the description thereof will be omitted. A cloud operator (MVNO carrier C in this example) borrows the base station 10A and the base station 10B, etc., lent from the MNO carrier A, and MNO carrier B, respectively. Here, terminals 1A and 1B of a user contracting with the MVNO carrier C are assumed to be SIM (Subscriber Identity Module)-free terminals, on each of which a SIM card (Subscriber Identity Module card) of the MNO carrier A or B versions is inserted. In this case, the terminals 1A and 1B respectively establish radio links (RRC (Radio Resource Control) Connected state) with the base stations 10A and 10B owned by the carriers A and B, respectively, and connect through the EPC networks 20A and 20B and via the Internet 30 to the virtual EPC 40 on a server (not shown) installed in the data center 50 of the cloud operator. The terminals 1A and 1B receive connection service via the virtual EPC 40 to the Internet 31, a cloud type content cache service, etc., provided by the cloud operator.

Here, let the MVNO carrier C, be such a carrier, though not particularly limited thereto, that integrates various services, for example, Application store (purchasing and downloading of Application);

Electronic-book store;

Delivery services of movies, television, music, etc.;

Purchasing of terminals (smart phone, tablet, PC (Personal Computer), etc.) (services including electronic payment and electronic commerce), and establishes an integrated service providing site for providing the service to the terminals 1A and 1B via a gateway 41.

The MVNO carder C, which is an owner of the data center 50, provides various cloud services. Therefore, contents or the like that the user has purchased using the terminals 1A and 1B are stored and managed on the cloud (data center 50), and using the same user account, are shared by a plurality of terminals (for example, smart devices, a tablet, or a PC (Personal Computer), or the like that the user owns).

In the related invention of FIG. 2, when the same user possesses the terminals 1A and 1B, usage details such as monthly (billing statement) are separately sent from the MNVO carrier C to the user, for each of the terminals 1A and 1B, respectively. Alternatively, a current usage status (communication amount, communication charge, etc.) of each of the terminals 1A and 1B may be sent online. It is noted that in FIG. 2, in the EPC networks 20A and 20B of the MNO carriers A and B, internal nodes are omitted and a PCRF database 24A-1 of the EPC network 20A of the carrier A and a PCRF database 24B-1 of the EPC network 20B of the carrier B are illustrated. In FIG. 2, the number of MNO carriers is not limited to two, but it may, as a matter of course, be three or more.

In some cases, the MVNO carrier C sells a SIM card for passing through the communication network of the MNO carrier A (base station 10A and EPC 20A in FIG. 2) and the communication network of the MNO carrier B (base station 10B and EPC 20B in FIG. 2). As a charging system, there may be a monthly payment system, such as 6000 yen per month, an upper limit of a communication amount being 7 GB/month, and no speed limit up to the upper limit, wherein when the communication amount exceeds the upper limit, the communication speed is set to low speed (128 bps (bit per second)). Alternatively, in a prepaid system, for example, a disposable SIM card (for example, 2000 yen) is used, and the communication capacity is, for example, 1 GB.

It is noted that in FIG. 2, the EPC network in the data center 50 is composed of a virtual EPC, but it need not be a virtual EPC. Further, in the data center 50, the functions of the gateway 41, routers and various other servers may be virtualized on one or more server apparatuses.

<Basic Mode>

Figure 3:
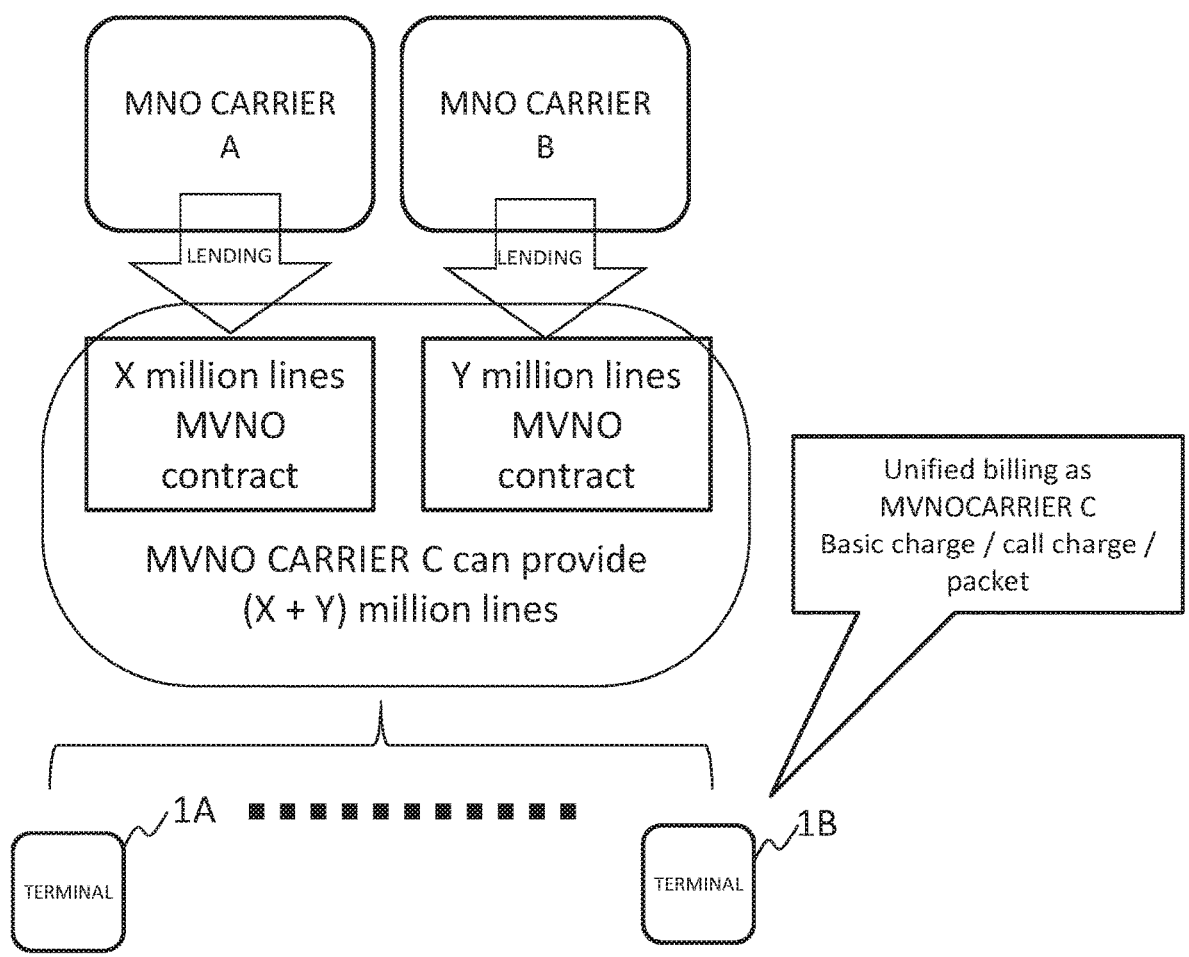
FIG. 3 is a diagram illustrating the basic concept of the invention.

FIG. 3 is a diagram illustrating an example of a basic mode (concept) of the present invention. The basic mode of the present invention may be implemented in the system of FIG. 2, for example. Referring, to FIG. 3, the MVNO carrier C borrows communication facilities from the MNO carrier A and the MNO carrier B, respectively. In the example shown in FIG. 3, for example, the MVNO carrier C borrows X million lines lent from the MNO carrier A and Y million lines lent from the MNO carrier B. MVNO carrier C can provide (X+Y) million lines. The MVNO carrier C performs charging management of a terminal into which a SIM card provided by the MVNO carrier C is inserted, in a unified manner (centralized manner), irrespective of whether the SIM card is a carrier A version or a carrier B version. At that time, for example, basic charge, call charge, communication charge, etc. can be collectively charged based on a user account registered at an integrated service providing site provided by the data center 50 (FIG. 2) owned by the MVNO carrier C. A user account established at the integrated service providing site may be a mail address of a free e-mail such as Web mail, for example. In this case, notification of usage details, etc. to the user may be made by free e-mail using this user account. Further, the user account may be an arbitrary ID (user ID or the like) associated with a mail address as described above.

A user using the integrated service providing site of the MVNO carrier C (cloud operator) can prepay for various services provided by the integrated service providing site (prepaid system). In this case, a charge for a SIM card provided by the MVNO carrier C contracted by the user may be automatically withdrawn from the prepaid balance. In this case, a withdrawal may be made based on a measured rate system, such as 1000 yen for communication amount: up to 1 GB, 3000 yen for communication amount: up to 4 GB, etc., or a flat rate system such as 2500 yen per month. As a special option for a user of a SIM card(s), such a license for using Wi-Fi (Wireless Fidelity: Wi-Fi is a registered trademark of Wi-Fi Alliance)—calling (Wi-Fi is used to make calls and SMS (short message service) A function to transmit and receive data) may be provided free or charged (fixed rate or measured rate) to the user, and if the license is charged, it may be added to the charge.

According to the basic mode of FIG. 3, in order to charge based on a user account, in a case where the user owns a plurality of terminals and uses one ID (common user account), charging for the plurality of terminals can be unified (consolidated) as charging for the common user account. For example, assuming that a user makes a contract with a MVNO carrier C (cloud operator) with a plan of 1,000 yen for communication amount up to 1 GB, and that the user has a smart phone and a tablet, the user can use up to 1 G, as an upper limit of total communication amounts of the smart phone and the tablet (for example, smartphone: 0.7 GB and tablet: 0.3 GB, etc.).

The user can make a contract with the MVNO carrier C, for example, from the integrated service providing site of the MVNO carrier C (cloud operator) using the user account. For example, the user can select according to a characteristic of each carrier, such as a carrier A being No. 1 as for ease of connection, while a carder B being No. 1 as for line stability, contract fee, or the like.

According to the basic mode of the present invention, as described above, when a plurality of terminals owned by a user contracting with the MVNO carrier C uses the communication network of the carrier A or the carrier B, charging will be unified, regardless of whether the communication network of the carrier A or the carrier B is used. Even when the same terminal uses the communication network of the carrier A and the communication network of the carrier B, with SIM cards of the carder A version and the carrier B version replaced, charging may be also unified.

According to the basic mode of the present invention, regarding a terminal contracting with a virtual communication operator providing a communication service by borrowing communication facilities owned by a plurality of communication carriers, it is possible to manage charging collectively for the plurality of communication carriers.

Furthermore, according to the basic mode of the present invention, it is possible to perform unified management of the charge related to communication and the charge related to a service (s) that can be provided to the user, based on user identification information.

Example Embodiment

Figure 4:
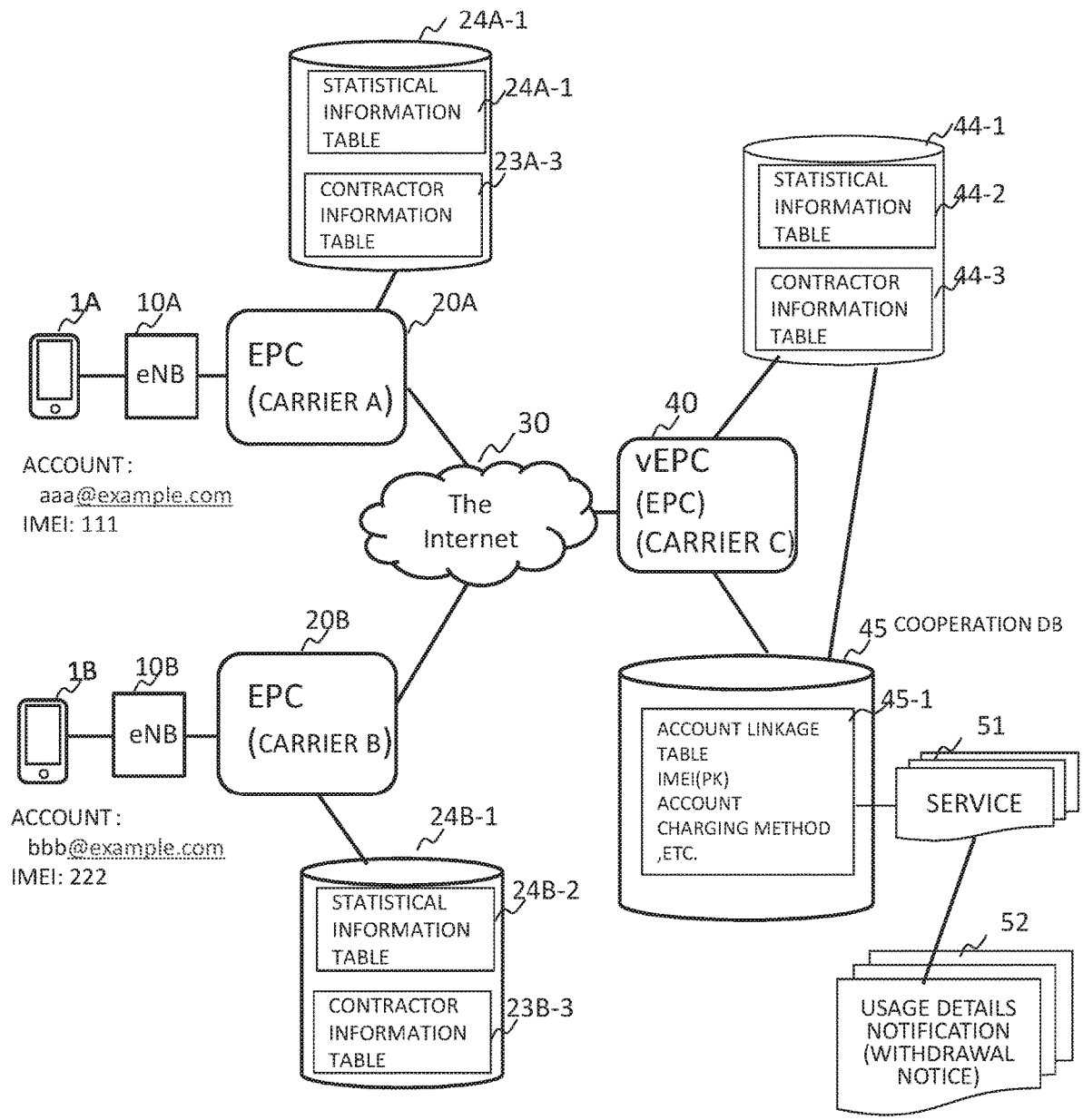
FIG. 4 is a diagram illustrating an example embodiment.

FIG. 4 is a diagram illustrating an example embodiment of the present invention. FIG. 4 illustrates an example in which the basic configuration of FIG. 3 is implemented in FIG. 2. Also in FIG. 4, as with FIG. 2, the MVNO carrier C borrows facilities such as a base station 10A, EPC 20A, etc., and a base station 10B, EPC 20B, etc., lent respectively by a MNO carrier A and MNO carrier B. It is noted that in FIG. 4, the data center 50 in FIG. 2 is omitted. In FIG. 4, base stations 10A and 10B, EPC networks 20A and 20B, PCRF databases 24A-1 and 24B-1, and the Internet 30 are the same as those in FIG. 2 and the description thereof will be omitted.

The EPC network 40 may be the same as the EPC network 40 in FIG. 2 (virtual EPC (vEPC), or EPC configured by actual machines). Although a PCRF database 44-1 of the EPC network 40 in FIG. 4, is not illustrated in FIG. 2, it may be mounted on the virtual EPC 40 of the data center 50 in FIG. 2, for example.

The essential difference between the example embodiment of FIG. 4 and the related invention of FIG. 2 is that the example embodiment includes a cooperation database 45 (database (DB) associated with PCRF database 44-1). A service (including a communication service) is provided to a user based on information in the cooperation database 45, and a withdrawal is automatically made.

The MVNO carrier C uses respective user's accounts (for example, "aaa@example.com", "bbb@example.com") for charging management of terminals 1A and 1B. The user account may be such as account information established by the user at the integrated service providing site (Web site) of the MVNO carrier C, and it may also be a free e-mail address such as Web mail, for example. Further, as described above, when the user account is an arbitrary ID, an electronic mail address associated with the ID corresponds to the user account. The cooperation database 45 may be managed by an authentication server (not illustrated). It is noted that in FIG. 4, IMEIs (International Mobile Equipment identity: 15 digits starting with 35) of the terminals 1A and 1B are simply expressed by three digits, such as 111 and 222, only for simplicity's sake.

The cooperation database 45 includes an account linkage table 45-1 to hold account information of the integrated service providing site of the MVNO carrier IMEI, (Primary Key (PK): information for uniquely identifying a set of data sets (records) from the database), and information such as a charging method.

Based on the correspondence (linkage) between the account information (user account) in the account linkage table 45-1 of the cooperation database 45 and an IMEI (PK) of the terminal, linkage of the statistical information table 44-2 of the PCRF database 44-1 and information of the contractor information table 44-3 (both including IMEI) is performed. Thus, it is possible to calculate communication charge, call time, call charge, and the like, based on the user account. As for a call time calculated for a terminal that can use Wi-fi Calling (a function of sending and receiving calls and SMS using Wi-Fi (registered trademark)), a call time by 3G (3rd Generation), 4G (4th Generation), or 5G (5th generation) and a call time by Wi-Fi Calling may be separately calculated. Further, the call charge may be calculated by setting charges different on per time based on the user accounts.

Figure 5:
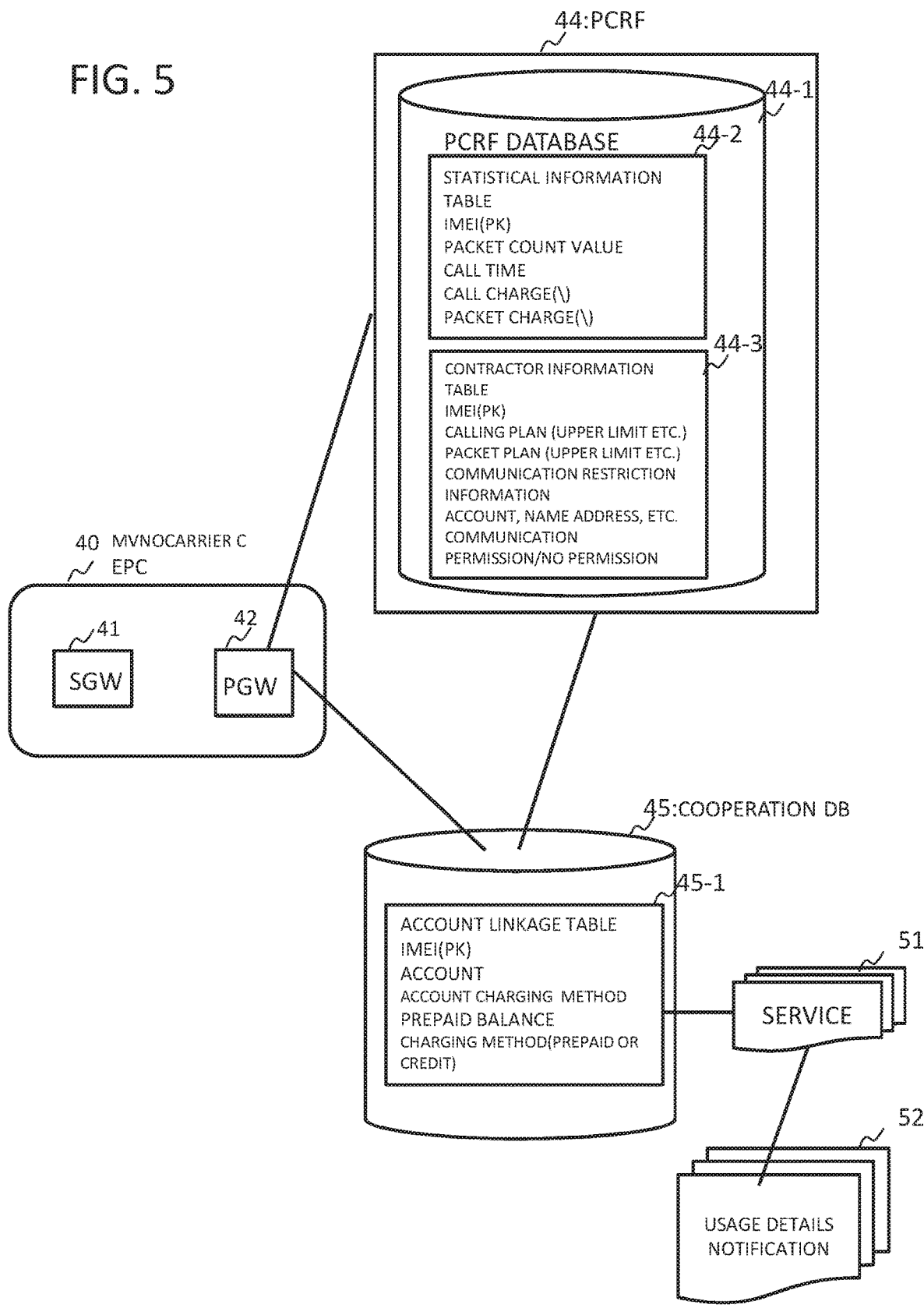
FIG. 5 is a diagram illustrating the example embodiment of FIG. 4 in detail.

FIG. 5 is a diagram schematically illustrating an example of information retained in the PCRF database 44-1 and the cooperation database 45 in FIG. 4.

Referring to FIG. 5, the statistical information table 44-2 of the PCRF database 44-1 included in the PCRF 44 (server) stores IMEI (PK) of the terminal of the user contracting with the MVNO carrier C, packet count value, call time (duration), call charge (¥) and packet charge (¥).

When the MVNO carrier C borrows the communication facilities from the MNO carriers A and B to provide the communication facilities to the user as a communication facility of the MVNO carrier C, a packet count value, call time, call charge (¥), and packet charge (¥) in the statistical information table 44-2, are calculated in such a way that a packet count value, call time, call charge (¥), and packet charge (¥), which the user terminal 1A (on which a carrier A version SIM card is inserted) uses the communication network of the MNO carrier A; and a packet count value, call time, call charge (¥), and packet charge (¥) for the terminal 1B on which (the carrier B version SIM card is inserted) and that has the same user account as the user account of the terminal 1A, are summed up and consolidated. In the statistical information table 44-2, as for summing of the call charge (¥) and summing of the packet charge (¥) in the communication network of the MNO carriers A and B of the terminal 1A and the terminal 1B, instead of simple addition of the charge of each carrier, a calculation using a unique charge calculation system such as a weighted addition with predetermined weight coefficients, based on the call charge (¥) and the packet charge (¥) of the communication network of the MNO carriers A and B, and based on the contract with the MNO carriers A and B, may be applied.

The contractor information table 44-3 includes information items such as IMEI (PK), calling plan (upper limit, etc.) packet plan (upper limit etc.), communication limit information, account, name and address, communication permission/non-permission, etc. of a user's terminal contracting with the MVNO carrier C.

A call plan (upper limit, etc.), packet plan (upper limit, etc.), and the communication limit information in the contractor information table 44-3 correspond to a call plan (upper limit, etc.), packet plan (upper limit, etc.), and the communication limit information obtained by summing those of the terminal 1A (on which a carrier A version SIM card is inserted) using the communication network of the MNO carrier A and the terminal 1B (on which a carrier B version SIM card is inserted) using the communication network of MNO carrier B.

The account linking table 45-1 of the cooperation database 45 includes information items such as MEI (PK), account, account charging method, prepaid reserve capacity of the account (balance of the prepaid account), charging method (prepaid method or credit card payment), etc., of a terminal. These items of information may be set from a management terminal (apparatus) of the MVNO carrier C, based on relevant information on which a user contracts with the MVNO carrier C. When the user's terminal uses the communication network of the MVNO carrier C or a service provided by the integrated service providing site of the MVNO carrier C (electronic book purchasing, etc.) (51), settlement is performed with reference to the cooperation database 45, and a use notification (withdrawal notification) is made (52).

Instead of unified charging management using the account, such as option of individually performing charging management for each user's terminal is available by setting of the account charging method in the account pegging table 45-1 of the cooperative database 45. In this case, a user, who is a subscriber of the MVNO carrier C and possesses a plurality of terminals (smart phone and tablet), can receive individually usage details of each terminal, with the MVNO carrier C performing charging management individually for each terminal. In the present example embodiment, as described above, the MVNO carrier C perform unified charging management for different carriers (MNO carriers A and B), based on a user account. However, instead of unified charging management for different carriers, when a user owns a plurality of terminals that use a communication facility of the same carrier (MNO carrier A, for example), charging, for the plurality of terminals may, as a matter of course, be unitarily managed based on the user account (together with the charging for use of a service(s) other than user's communication, and call). That is, when a user of the MVNO carrier C owns a plurality of terminals having a SIM card of the carrier A in FIG. 4, packet count values, call time, call charge, packet charge, etc., of the plurality of terminals are linked by a user account common to the plurality of terminals, and a unified charging information into which charging information of the plurality of terminals are consolidated, is notified to the user.

Figure 6:
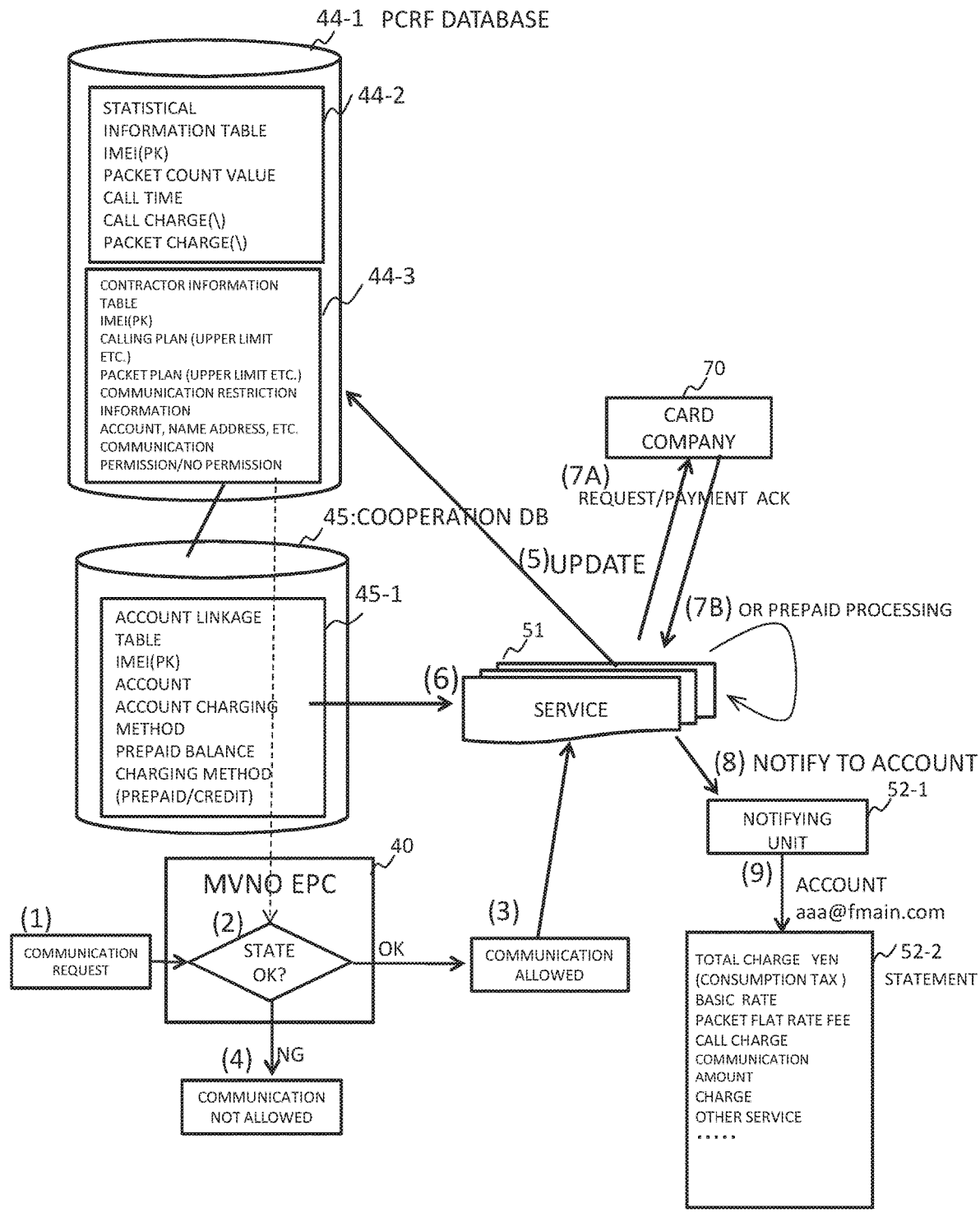
FIG. 6 is a diagram illustrating a sequence of an example embodiment.

FIG. 6 is a diagram illustrating an operation of the example embodiment illustrated in FIGS. 4 and 5. The operation sequence of the present example embodiment will be described with reference to FIG. 6.

(1) A communication request is made from the terminal (for example, 1A in FIG. 4) to the EPC network 40 of the MVNO carrier C via the base station (for example, 10A in FIG. 4). At that time, IMEI information of the terminal is transmitted from the base station (for example, 10A in FIG. 4) to the EPC network 40 of the MVNO carder C, using a predetermined message.

(2) In the EPC network 40 (for example, PCRF 44, PCEF, PGW 42, etc.) of the MVNO carrier C, IMEI of the terminal, IMEI of the cooperation database 45, and IMEIs of the statistical information table 44-2 and the contractor information table 44-3 are collated. If the collation result of the IMEI of the terminal is okay and a password authentication of the user account (performed by an authentication server not illustrated) is okay, then payment confirmation is performed. When the charging method for the terminal is of a prepaid type, a balance of the prepaid account is confirmed. If it is confirmed that a prepaid balance remains, it is judged that the terminal authentication and the payment confirmation are okay.

(3) When both results of the terminal authentication and the payment confirmation are okay, communication of the terminal is allowed. When the communication is allowed, the communication service is provided to the terminal.

(4) When the terminal authentication is not okay (in the case of NG (No good)), the communication of the terminal is not allowed. Even in the case where the terminal authentication is okay, if the payment confirmation is not okay, the communication or the terminal is not allowed. It is noted that regarding a terminal, if the terminal authentication thereof is okay and the payment confirmation thereof is not okay (NO), PGW (42 in FIG. 5) and so forth may allow the terminal to perform communication at low-speed communication (for example, 128 kbps), for a predetermined period, based on policy setting by PCRF (44 in FIG. 5), and PCEF).

(5) As a result of the communication permission, the communication service by the MVNO carrier C is provided to the terminal, and the communication amount of the terminal is measured. The communication amount of the terminal is totaled up, every month, every day, or at an arbitrary timing (online), and the packet count value and the like of the statistical information table 44-2 are updated.

As an option, the communication data amount of a predetermined application can be excluded from the packet count. A data destination, a data header, and so forth may be collated to a predetermined list, and matched data may be excluded from the packet count.

(6) The MVNO carrier C executes charging processing, monthly, daily, or at an arbitrary timing. A predetermined fixed fee or a fee corresponding to a communication amount may be withdrawn. At that tune, account information of the cooperation database 45, charging method, and account information (credit card number) are acquired.

(7) The MVNO carrier C charges the usage fee of the terminal (7A) to a card company 70, or performs prepaid processing (7B).

(8) The integrated service providing site of the MVNO carrier C (site (server) providing the service 51 in FIG. 5) notifies usage details to the user account via notifying unit 52-1, such as electronic mail (for example, Web mail etc.) or the like.

(9) The usage details (for example, basic monthly fee, packet flat rate fee, communication and call charges, etc.) are notified to the user's terminal. When the charging method is payment by credit card, details on withdrawal from the credit company is sent to the user, for example, one month behind.

<Charging Apparatus>

Figure 7:
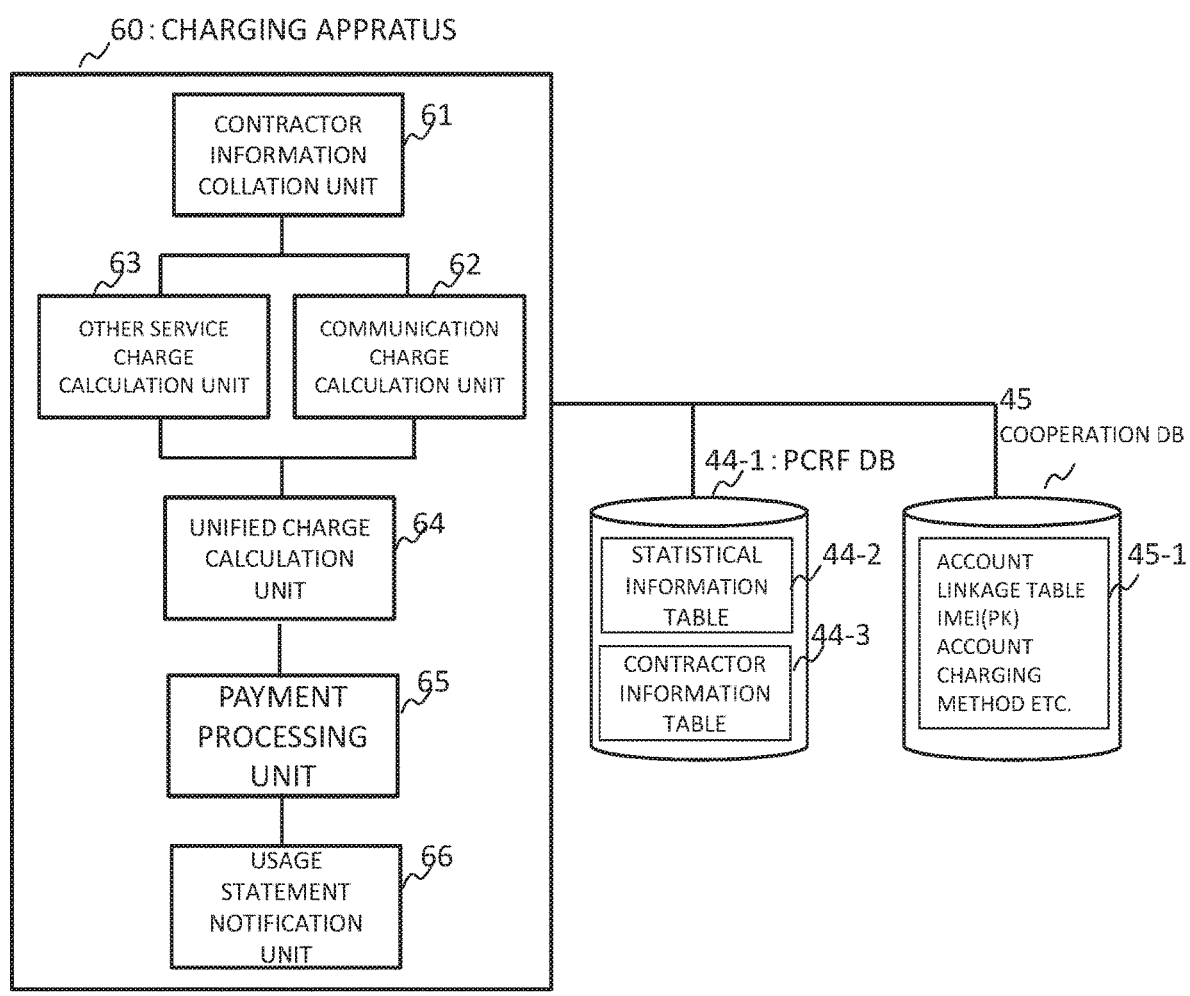
FIG. 7 is a diagram illustrating an example of a charging apparatus according to an example embodiment.

FIG. 7 is a diagram illustrating an example of a configuration of a charging apparatus (charging server) 60 of the MVNO carrier C. The charging apparatus (charge management apparatus) of the MVNO carrier C is connected to the EPC network 40, the PCRF database 44-1, and the cooperation database 45 in FIG. 4. The charging apparatus of the MVNO carrier C may be provided in the data center (50 in FIG. 2) owned by the MVNO carrier C.

Referring to FIG. 7, the charging apparatus 60 includes a contractor information collation unit 61, a communication charge calculation unit 62, other service charge calculation unit 63, unified charge calculation unit 64, payment processing unit 65, and a usage details notification unit 66.

The contractor information collation unit 61 collates the terminal identification information (IMEI) with the user's account information, to make a linkage therebetween. The communication charge calculation unit 62 acquires communication charge and call charge from the PCRF database 44-1 with respect to each terminal (on which a SIM card of the MVNO carrier C is mounted) of the IMEI corresponding to a user's account. When the user owns a plurality of terminals (on each of which a SIM card of the MVNO carrier C is mounted) with the same account, the communication charge calculation unit 62 calculates communication charge and call charge of each terminal from the PCRF database 44-1 The other service charge calculation unit 63 acquires charging information of a service (for example, electronic book purchasing, music delivery, etc.) provided by the integrated service providing site of the MVNO carrier C.

The unified charge calculation unit 64 sums up charges from the communication charge calculation unit 62 and the other service charging calculation unit 63. The payment processing unit 65 either withdraws a predetermined fixed fee, on a monthly or daily basis, or at an arbitrary timing, or withdraws a fixed fee corresponding to the communication amount. That is, the payment processing unit 65 either requests the usage charge to the credit card company (70 in FIG. 6) with a credit card number, or withdraws from the prepaid balance. The usage details notification unit 66 creates usage details in response with a monthly, daily, or an arbitrary timing withdrawal, and transmits to the user the usage details, for example, by electronic-mail (for example, Web mail) or the like.

Even if the user has a separate contract with a MVNO carrier regarding each of a plurality of terminals owned by the user, using a common user account (contract contents for the terminals such as quota are different), monthly usage details may be done once in a single notification in which a total charge amount of the plurality of terminals is included and a communication charge or the like of each individual terminal may be described by breakdown of the details.

In FIG. 7, a part or all of functions of the contractor information collation unit 61, communication charge calculation unit 62, other service charge calculation unit 63, unified charge calculation unit 64, payment processing unit 65, and the usage details notification unit 66 may, as a matter of course, be realized by a program executed on a computer such as a server. The program may be stored in a storage unit (a hard disk drive unit or a semiconductor storage unit or the like) (not illustrated), loaded into a main memory of the computer, and executed.

As a variation example of the example embodiment, with respect to the user's terminal, when a prepaid reserve capacity (balance) of the terminal in the cooperation database 45 becomes equal to or less than a predetermined value or the balance becomes 0, the fact may be notified via the notifying unit 52-1 to the terminal of the user. A low-speed communication (for example, 128 kbps) of the terminal for a predetermined period of time, may be allowed under the above described communication policy control made by OCS, PCRF, PCEF, PGW, etc., even when a prepaid balance of the terminal is zero and not charged.

According to the example embodiment, it is possible to perform unified charging for one or more terminals contracting with a MVNO carrier that borrows communication facilities owned by a plurality of carriers and provides communication services, thereby improving convenience and services. In addition, it is possible to enhance convenience and increase usage of a site(s) that provides various services by unifying charging to a user who uses the site(s) and charging to the user contracting with the MVNO carrier.

Each disclosure of the above-listed Non Patent Literature is incorporated herein by reference. Modification and adjustment of each exemplary embodiment or each example are possible within the scope of the overall disclosure including the claims of the present invention and based on the basic technical concept of the present invention. Various combinations and selections of various disclosed elements (including each element in each claim, each element in each example, each element in each drawing, and so on) are possible within the scope of the claims of the present invention. That is, the present invention naturally includes various variations and modifications that could be made by those skilled in the art according to the overall disclosure including the claims and the technical concept.

The above-described embodiment may be annexed, for example, as follows, though not limited thereto.

(Supplementary Note 1)

A charging management apparatus connected to a communication network of a virtual communication operator, the apparatus comprising:

a first unit that specifies user identification information for identifying a user of a first terminal connecting to the communication network of the virtual communication operator via a first communication network of a first communication operator; and a second unit that manages charging for communication of the first terminal and charging for a service that the virtual communication operator is enabled to provide to the user identified by the user identification information.

(Supplementary Note 2)

The charging management apparatus according to supplementary note 1, wherein the first unit specifies user identification information for identifying a user of a second terminal connecting to the communication network of the virtual communication operator via a second communication network of a second communication operator, and wherein the second unit, based on the user identification information specified respectively with respect to the first terminal and the second terminal, manages charging for communication of the first terminal, and charging for communication of the second terminal.

(Supplementary Note 3)

The charging management apparatus according to supplementary note 1 or 2, wherein the user identification information is common to user identification information commonly used in utilization of one or a plurality of kinds of services that the virtual communication operator is enabled to provide, wherein the second unit, based on terminal identification information of each terminal and the user identification information specified for the each terminal, manages charging for communication of the each terminal, in cooperation with charging for use of the one or the plurality of kinds of services by the each terminal.

(Supplementary Note 4)

The charging management apparatus according supplementary note 2 or 3, comprising:

a first storage unit including at least one of the terminal identification information of each terminal and at least one of a packet transfer amount, a packet charge, and a call time of a terminal corresponding to the terminal identification information, as information on communication of each terminal;

a second storage unit including terminal identification information of a terminal owned by the user and at least one of a communication plan or limitation, and account information, as information on the user; and a third storage unit that manages the user identification information and the terminal identification information in association with each other.

(Supplementary Note 5)

The charging management apparatus according to supplementary note 4, wherein the third storage unit stores a charging method including at least one of prepayment or payment by a credit card, in correspondence with the user identification information.

(Supplementary Note 6)

The charging management apparatus according to supplementary note 5, further comprising a unit that transmits to the terminal a notification to as such, when a prepaid balance becomes equal to or less than a predetermined value or runs out.

(Supplementary Note 7)

The charging management apparatus according to any one of supplementary notes 1 to 6, wherein the communication network of the virtual communication operator includes a virtualized network.

(Supplementary Note 8)

The charging, management apparatus according to supplementary note 1, wherein, when the user identification information of one or more terminals each connecting to the communication network of the virtual communication operator via a communication network of the first communication operator or a second communication operator is the same as the user identification information of the second terminal, as a result of specifying the user identification information by the first unit, the second unit sums a charge for communication of the one or more terminals and a charge for communication of the first terminal in association with the same user identification information to perform a unified management thereof.

(Supplementary Note 9)

A charging management apparatus that connects to a communication network of a virtual communication operator that provides a communication service using a communication facility of a first communication network of a first communication operator and a communication facility of a second communication network of a second communication operator, the apparatus comprising:

a first unit that specifies first user identification information for identifying a user of a first terminal connected to the communication network of the virtual communication operator via the first communication network, and specifying second user identification information for identifying a user of a second terminal connecting to the communication network of the virtual communication operator via the second communication network; and a second unit that manages charging for communication of the first terminal based on the first user identification information, and charging for communication of the second terminal based on the second user identification information, (Supplementary Note 10)

The charging management apparatus according to supplementary note 9, wherein when the first user identification information and the second user identification information are the same as the result of specifying the user identification information by the first unit, the second unit sums a charge for communication of the first terminal and a charge for communication of the second terminal in association with the same user identification information to perform a unified management thereof.

(Supplementary Note 11)

A communication system comprising:

a communication network of a virtual communication operator that provides a communication service by using a communication facility of a first communication network of a first communication operator and a communication facility of a second communication network of a second communication operator; and a charging management apparatus connected to the communication network of the virtual communication operator, wherein the charging management apparatus comprises:

a first unit that specifies user identification information for identifying a user of a first terminal connecting to the communication network of the virtual communication operator via the first communication network of the first communication operator; and a second unit that manages charging for communication of the first terminal and charging for a service that the virtual communication operator is enabled to provide to the user identified by the user identification information.

(Supplementary Note 12)

The communication system according to supplementary note 11, wherein in the charging management apparatus, the first unit specifies user identification information for identifying a user of a second terminal connecting to the communication network of the virtual communication operator via the second communication network of a second communication operator, and wherein the second unit, based on the user identification information specified respectively with respect to the first terminal and the second terminal, manages charging for communication of the first terminal, and charging for communication of the second terminal.

(Supplementary Note 13)

The communication system according to supplementary note 11 or 12, wherein the user identification information is common to user identification information commonly used in utilization of one or a plurality of kinds of services that the virtual communication operator is enabled to provide, wherein in the charging management apparatus, the second unit, based on terminal identification information of each terminal and the user identification information specified for the each terminal, manages charging for communication of the each terminal, in cooperation with charging for use of the one or the plurality of kinds of services by the each terminal.

(Supplementary Note 14)

The communication system according to supplementary note 12 or 13, comprising:

a first storage unit including at least one of the terminal identification information of each terminal and at least one of a packet transfer amount, a packet charge, and a call time of a terminal corresponding to the terminal identification information, as information on communication of each terminal;

a second storage unit including terminal identification information of a terminal owned by the user and at least one of a communication plan or limitation, and account information, as information on the user; and a third storage unit that manages the user identification information and the terminal identification information in association with each other.

(Supplementary Note 15)

The communication system according to supplementary note 14, wherein the third storage unit stores a charging method including, at least one of prepayment or payment by a credit card, in correspondence with the user identification information.

(Supplementary Note 16)

The communication system according to supplementary note 15, further comprising a unit that transmits to the terminal a notification to as such, when a prepaid balance becomes equal to or less than a predetermined value or runs out.

(Supplementary Note 17)

The communication system according to any one of supplementary notes 11 to 16, wherein that the communication network of the virtual communication operator includes a virtualized network.

(Supplementary Note 18)

The communication system according to supplementary note 11, wherein, when the user identification information of one or more terminals each connecting to the communication network of the virtual communication operator via a communication network of the first communication operator or a second communication operator is the same as the user identification information of the second terminal, as a result of specifying the user identification information by the first unit, the second unit sums a charge for communication of the one or more terminals and a charge for communication of the first terminal in association with the same user identification information to perform a unified management thereof.

(Supplementary Note 19)

A charging management method comprising:

specifying user identification information for identifying a user of a first terminal connecting to a communication network of a virtual communication operator via a first communication network of a first communication operator; and managing charging for communication of the first terminal and charging for a service that the virtual communication operator is enabled to provide to the user identified by the user identification information.

(Supplementary Note 20)

The charging management method according to supplementary note 19, comprising:

specifying user identification information for identifying a user of a second terminal connecting to the communication network of the virtual communication operator via a second communication network of a second communication operator, and based on the user identification information specified respectively with respect to the first terminal and the second terminal, managing charging for communication of the first terminal, and charging for communication of the second terminal.

(Supplementary Note 21)

The charging management method according to supplementary note 19 or 20, wherein the user identification information is common to user identification information commonly used in utilization of one or a plurality of kinds of services that the virtual communication operator is enabled to provide, the method comprising based on terminal identification information of each terminal and the user identification information specified for the each terminal, managing charging for communication of the each terminal, in cooperation with charging for use of the one or the plurality of kinds of services by the each terminal.

(Supplementary Note 22)

The charging management method according to supplementary note 20 or 21, comprising, as information on communication of each terminal, a first storage unit storing at least one of the terminal identification information of each terminal and at least one of a packet transfer amount, a packet charge, and a call time of a terminal corresponding to the terminal identification information;

as information on the user, a second storage unit storing terminal identification information of a terminal owned by the user and at least one of a communication plan or limitation, and account information, as information on the user; and a third storage unit storing the user identification information and the terminal identification information in association with each other.

(Supplementary Note 23)

The charging management method according to supplementary note 22, wherein the third storage unit stores a charging method including at least one of prepayment or payment by a credit card corresponding to the user identification information.

(Supplementary Note 24)

The charging management method according to supplementary note 23, comprising transmitting to the terminal a notification to as such, when a prepaid balance becomes equal to or less than a predetermined value or runs out.

(Supplementary Note 25)

The charging management method according to supplementary note 19, comprising when the user identification information of one or more terminals each connecting to the communication network of the virtual communication operator via a communication network of the first communication operator or a second communication operator is the same as the user identification information of the second terminal, as a result of specifying the user identification information by the first unit, summing a charge for communication of the one or more terminals and a charge for communication of the first terminal in association with the same user identification information to perform a unified management thereof.

(Supplementary Note 26)

A non-transitory computer readable recording medium storing therein a program causing a computer constituting a charge management apparatus connected to a communication network of a virtual communication operator, to execute:

a first processing that specifies user identification information for identifying a user of a first terminal connecting to the communication network of the virtual communication operator via a first communication network of a first communication operator; and a second processing that manages charging for communication of the first terminal and charging for a service that the virtual communication operator is enabled to provide to the user identified by the user identification information.

(Supplementary Note 27)

The non-transitory medium according to supplementary note 26, wherein the first processing specifies user identification information for identifying a user of a second terminal connecting to the communication network of the virtual communication operator via a second communication network of a second communication operator, and wherein the second processing, based on the user identification information specified respectively with respect to the first terminal and the second terminal, manages charging for communication of the first terminal, and charging for communication of the second terminal.

(Supplementary Note 28)

The non-transitory medium according to supplementary note 26 or 27, wherein the user identification information is common to user identification information commonly used in utilization of one or a plurality of kinds of services that the virtual communication operator is enabled to provide, wherein the second processing, based on terminal identification information of each terminal and the user identification information specified for the each terminal, manages charging for communication of the each terminal, in cooperation with charging for use of the one or the plurality of kinds of services by the each terminal.

(Supplementary Note 29)

The non-transitory medium according to supplementary note 27, wherein, when the user identification information of the first terminal and the user identification information of the second terminal are the same, as a result of specifying, the user identification information by the first processing, the second processing sums a charge for communication of the first terminal and a charge for communication of the second terminal in association with the same user identification information to perform a unified management thereof.

What is claimed is:

1. A charging management apparatus comprising:
a memory storing instructions; and
a processor configured to execute the instructions to:
specify first user identification information comprising first charging information for connecting to a communication network via a first network operator;
specify second user identification information comprising second charging information for connecting to the communication network via a second network operator; and
based on the specified first user identification information and the specified second user identification information, unify the first charging information and the second charging information to an account for a service of a virtual network operator.

2. The charging management apparatus according to claim 1,
wherein the service is provided by the virtual network operator, via a data center operated by the virtual network operator.

3. The charging management apparatus according to claim 1,
wherein the processor is further configured to execute the instructions to:
charge for the service to the account.

4. The charging management apparatus according to claim 1,
wherein the processor is further configured to execute the instructions to:
receive a charging method including at least one of prepayment or payment by a credit card, in correspondence with the first user identification information or the second user identification information.

5. The charging management apparatus according to claim 1,
wherein the first user identification information is for telecom carrier service provided by at least one of the first network operator or the second network operator; and
wherein the second user identification information is for a cloud service.

6. The charging management apparatus according to claim 1,
wherein the processor is further configured to execute the instructions to:
transmit to the account a notification when a prepaid balance becomes equal to or less than a predetermined value or runs out.

7. A charging management method comprising:
specifying first user identification information comprising first charging information for connecting to a communication network via a first network operator;
specifying second user identification information comprising second charging information for connecting to the communication network via a second network operator; and
based on the specified first user identification information and the specified second user identification information, unifying the first charging information and the second charging information to an account for a service of a virtual network operator.

8. The charging management method according to claim 7,
wherein the service is provided by the virtual network operator, via a data center operated by the virtual network operator.

9. The charging management method according to claim 7, further comprising:
charging for the service to the account.

10. The charging management method according to claim 7, further comprising:
receiving a charging method including at least one of prepayment or payment by a credit card, in correspondence with the first user identification information or the second user identification information.

11. The charging management method according to claim 7, wherein the first user identification information is for telecom carrier service provided by at least one of the first network operator or the second network operator; and wherein the second user identification information is for a cloud service.

12. The charging management method according to claim 7, further comprising:

transmitting to the account a notification when a prepaid balance becomes equal to or less than a predetermined value or runs out.

* * * * *

UNITED STATES PATENT AND TRADEMARK OFFICE
CERTIFICATE OF CORRECTION

PATENT NO.         : 10,863,037 B2
APPLICATION NO.    : 16/733369
DATED              : December 8, 2020
INVENTOR(S)        : Shintaro Nakano, Satoru Ishii and Hideo Hasegawa Page 1 of 2

It is certified that error appears in the above-identified patent and that said Letters Patent is hereby corrected as shown below:

In the Specification

Column 1, Technical Field, Line 17; Before "system,", insert --a--

Column 1, Background, Line 64; Delete "24A," and insert --24A.-- therefor

Column 2, Background, Line 22; After "terminal", insert --1A--

Column 2, Background, Line 23; Delete "GCS" and insert --OCS-- therefor

Column 2, Background, Line 28; Delete "24" and insert --24A-- therefor

Column 4, Summary, Line 24; Delete "operator," and insert --operator;-- therefor Column 5, Detailed Description, Line 2; After "Virtualization)", insert --,--

Column 5, Detailed Description, Line 9; Delete "PCF" and insert --PCRF-- therefor Column 5, Detailed Description, Line 17; Delete "NIC)," and insert --(NIC),-- therefor Column 5, Detailed Description, Line 18; Delete "NEVI (Network." and insert --NFVI (Network-- therefor Column 5, Detailed Description, Lines 18-19; Delete "infrastructure)" and insert --Infrastructure)-- therefor Column 5, Detailed Description, Line 20; Delete "details)," and insert --details).-- therefor Column 6, Detailed Description, Line 44; Delete "Referring," and insert --Referring-- therefor Signed and Sealed this
Thirtieth Day of March, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,863,037 B2

Column 7, Detailed Description, Line 33; Delete "carder" and insert --carrier-- therefor Column 7, Detailed Description, Line 43; Delete "carder" and insert --carrier-- therefor Column 8, Detailed Description, Line 28; Delete "identity:" and insert --Identity:-- therefor Column 8, Detailed Description, Line 34; Delete "IMEI," and insert --C, IMEI-- therefor Column 8, Detailed Description, Line 47; Delete "Wi-fi" and insert --Wi-Fi-- therefor Column 9, Detailed Description, Line 38; Delete "MEI" and insert --IMEI-- therefor Column 10, Detailed Description, Line 1; Delete "charging," and insert --charging-- therefor Column 10, Detailed Description, Line 21; Delete "carder" and insert --carrier-- therefor Column 10, Detailed Description, Line 44; Delete "or" and insert --of-- therefor Column 10, Detailed Description, Line 47; Delete "(NO)," and insert --(NG),-- therefor Column 10, Detailed Description, Line 67; Delete "tune," and insert --time,-- therefor Column 12, Detailed Description, Line 37; Before "including", insert --(--

Column 12, Detailed Description, Line 38; After "claims", insert --)--

Column 13, Detailed Description, Line 22; After "according", insert --to--

Column 13, Detailed Description, Line 55; Delete "charging," and insert --charging-- therefor Column 15, Detailed Description, Line 29; Delete "including," and insert --including-- therefor Column 17, Detailed Description, Line 46; Delete "specifying," and insert --specifying-- therefor Column 17, Detailed Description, Line 51; Delete "management:" and insert --management-- therefor